United States Patent [19]

Iwata et al.

[11] 4,079,390

[45] Mar. 14, 1978

[54] APERTURE SETTING DEVICE FOR USE WITH EXPOSURE CONTROL DEVICE

[75] Inventors: Hiroshi Iwata; Katsuji Ishikawa, both of Osaka, Japan

[73] Assignee: West Electric Co., Ltd., Japan

[21] Appl. No.: 621,843

[22] Filed: Oct. 14, 1975

[30] Foreign Application Priority Data

Oct. 18, 1974 Japan .................................. 49-120902

[51] Int. Cl.² .............................................. G03B 7/08
[52] U.S. Cl. .................................. 354/44; 354/23 D; 354/29; 354/42; 354/59; 354/60 A
[58] Field of Search ................... 354/29, 38, 23 D, 40, 354/42, 44, 50, 51, 60 A, 59

[56] References Cited

U.S. PATENT DOCUMENTS

| | | | |
|---|---|---|---|
| 3,750,540 | 8/1973 | Yanagisawa et al. | 354/51 |
| 3,813,680 | 5/1974 | Wagensonner et al. | 354/44 |
| 3,882,522 | 5/1975 | Erlichman | 354/44 |

*Primary Examiner*—Russell E. Adams

*Attorney, Agent, or Firm*—Burgess, Ryan and Wayne

[57] ABSTRACT

The aperture setting blades, which are drivingly coupled to a step-motor, have main openings which define the main aperture through which a subject is focused upon the photosensitive recording medium, and incident light control means adapted to control the quantity of light from the subject incident upon a photosensitive transducer. In response to the output from the photosensitive transducer, the transmission of clock pulses from a pulse generator to a step-motor control circuit is controlled so that the main aperture may be opened to the optimum opening area depending upon the brightness of the subject. Light control means consists of an auxiliary aperture defined by auxiliary openings cut through the shutter blades and adapted to change its opening area in proportion to that of the main aperture or an electro-optical element such as a liquid crystal or Kerr cell whose light transmissibility changes when subjected to the electric field which is changed in response to the opening area of the main aperture.

15 Claims, 18 Drawing Figures

FIG. 3A
| COIL | FIRST STEP | SECOND STEP | THIRD STEP | FOURTH STEP |
|------|------------|-------------|------------|-------------|
| 17a  | ON         |             |            | ON          |
| 17b  |            | ON          | ON         |             |
| 18a  | ON         | ON          |            |             |
| 18b  |            |             | ON         | ON          |
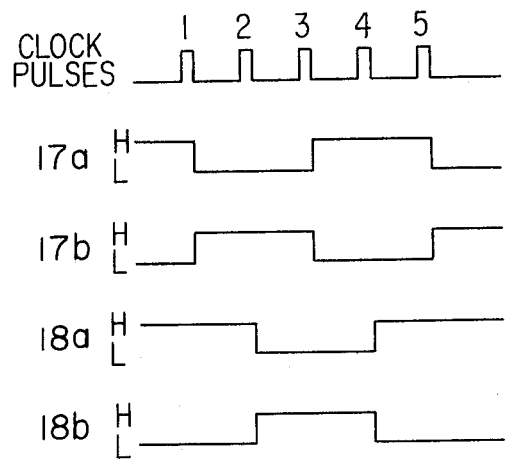
FIG. 3B
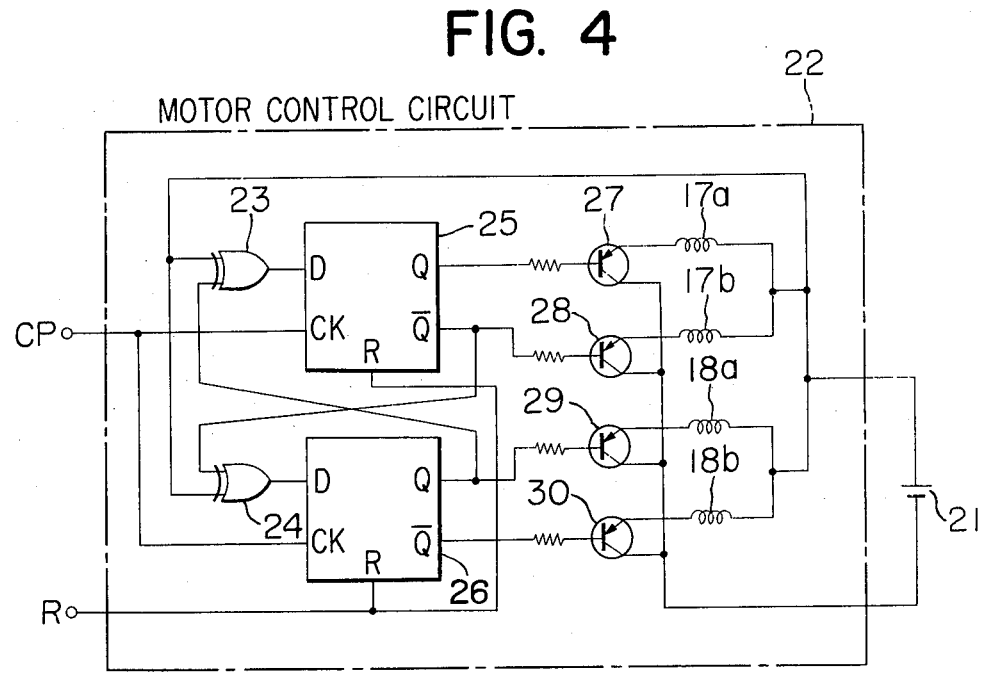
FIG. 4

FIG. 6C
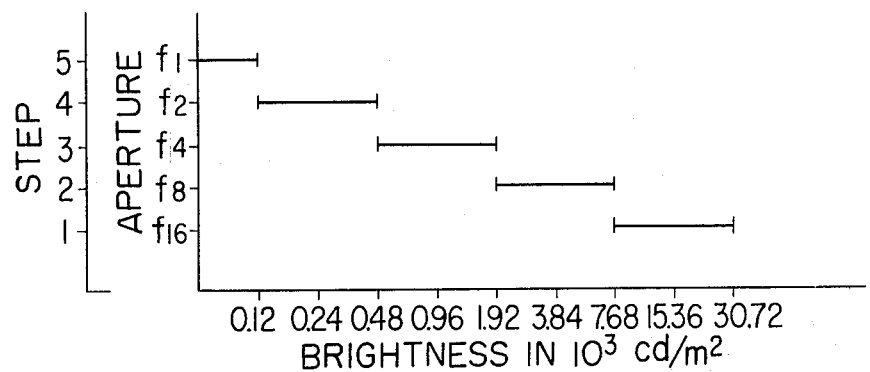
FIG. 7A  BRIGHTNESS OF A SUBJECT IS LOW
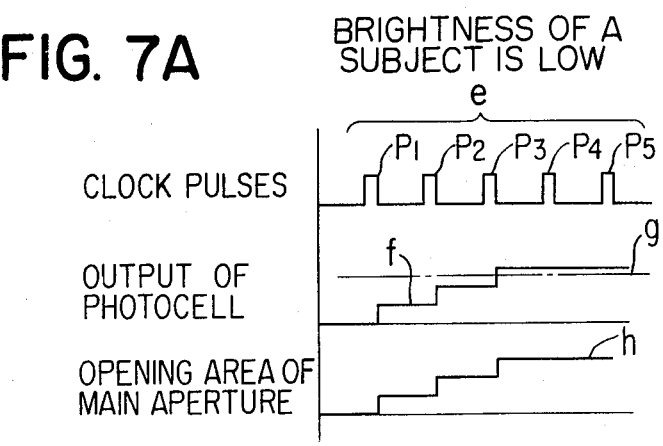
FIG. 7B  BRIGHTNESS OF A SUBJECT IS HIGH
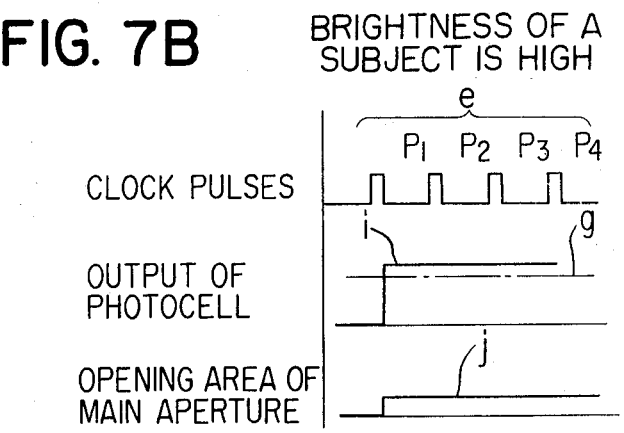

APERTURE SETTING DEVICE FOR USE WITH EXPOSURE CONTROL DEVICE

BACKGROUND OF THE INVENTION

The present invention relates to an aperture setting device for use with an exposure control device for setting the optimum aperture depending upon the brightness or luminance of a subject.

There have been devised and demonstrated various automatic exposure control devices of the type in which a plurality of aperture setting blades are drivingly coupled to a galvanometer or servomotor so that they are driven to define the optimum aperture or f/number depending upon the brightness of a subject to be photographed. These automatic exposure control devices have a common serious defect that the response of the galvanometer or servomotor to the sudden change in brightness of a subject is so slow that the aperture or f/number set by the aperture setting blades cannot precisely follow the change in brightness of the subject. In the galvanometer or servomotor, the light-weight moving coil or rotor is rotated by a stationary magnetic circuit so that when the moving coil or rotor is stopped at a desired position, it overshoots and rests in position after a considerable time of damping. Therefore, the response to the change in brightness of a subject is further adversely affected. Moreover, the prior art automatic exposure control devices are objectionable in that when the mechanical shock is imparted them, they are easily damaged or malfunction occurs because the ends of the shaft of the moving coil or rotor are sharply pointed in order to reduce the friction as much as possible.

SUMMARY OF THE INVENTION

In view of the above, the present invention is intended to overcome the defects encountered in the prior art automatic exposure devices. Briefly stated, according to the present invention, the aperture setting blades, which are drivingly coupled to a stepper motor, have main openings which define the main aperture through which a subject is focused upon the photosensitive recording medium, and incident light control means adapted to control the quantity of light from the subject incident upon a photosensitive transducer. In response to the output from the photosensitive transducer, the transmission of clock pulses from a pulse generator to a step-motor control circuit is controlled so that the main aperture may be opened to the optimum opening area depending upon the brightness of the subject. Light control means consists of an auxiliary aperture defined by auxiliary openings cut through the shutter blades and adapted to change its opening area in proportion to that of the main aperture or an electro-optical element such as a liquid crystal or Kerr cell whose light transmissibility changes when subjected to the electric field which is changed in response to the opening area of the main aperture.

BRIEF DESCRIPTION OF THE DRAWINGS

FIG. 3A shows the sequence of the coil sections to be energized when the step-motor is rotated step by step;

FIG. 3B is a time chart showing the time intervals during which the coil sections of the step-motor are energized for rotating the step-motor;

FIG. 4 is a diagram of a step-motor control circuit;

FIG. 6C is a view used for the explanation of the opening area of a main aperture of the first embodiment and the luminance of a subject;

FIG. 7A and 7B views used for the explanation of the mode of operation of the first embodiment;

Same reference numerals are used to designate similar parts throughout the figures.

DESCRIPTION OF THE PREFERRED EMBODIMENTS:

First Embodiment, FIGS. 1 through 7

Figure 1A:
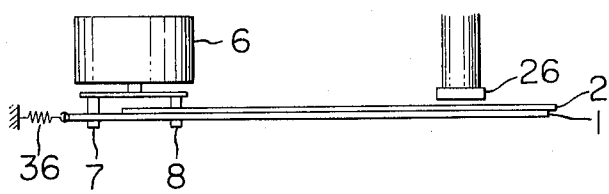
FIG. 1A is a schematic top view of an aperture setting mechanism of a first embodiment of the present invention.
Figure 1B:
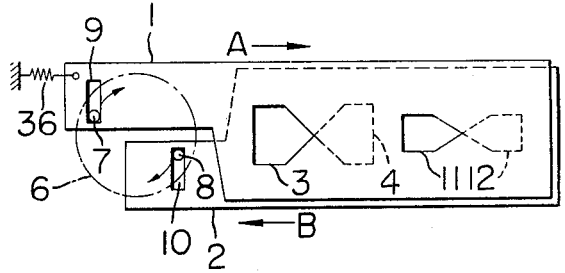
FIG. 1B is a schematic front view thereof showing aperture setting blades in closed position.
Figure 1C:
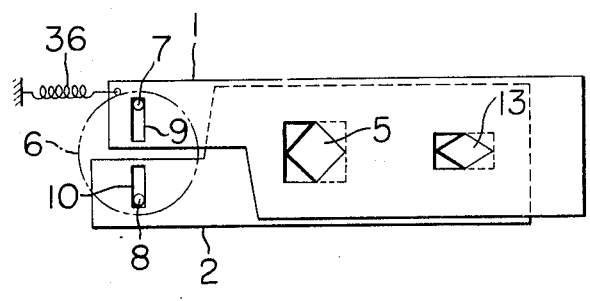
FIG. 1C is a view similar to FIG. 1B showing the aperture setting blades in wide opened position.

Referring to FIG. 1, there is shown an aperture control or setting mechanism of the first embodiment of the present invention, comprising two aperture setting or shutter blades 1 and 2 and a stepper motor 6. The blades 1 and 2 have main openings 3 and 4 and auxiliary openings 11 and 12 similar in configuration to the main openings 3 and 4, and guide slots 9 and 10. Two driving pins 7 and 8 are extended in diametrically opposed relation from a disk coaxially attached to the driving shaft of a stepper motor 1, and are loosely fitted into the guide slots 9 and 10, respectively, of the aperture setting blades 1 and 2. A return spring 36 is loaded between the blade 1 and a suitable stationary member. When the stepper motor 1 rotates one step through a predetermined angle in the direction indicated by the arrow in FIG. 1B which shows the shutter blades 1 and 2 in closed position, the driving pins 7 and 8 causes the displacement of the shutter blades 1 and 2 in the directions indicated by the arrows A and B, respectively, in FIG. 1B, so that the main openings 3 and 4 and the auxiliary openings 11 and 12 partially overlap to define the main aperture 5 and the auxiliary aperture 13. As the step-motor 1 continues the step-by-step angular displacements, the opening areas of the main and auxiliary apertures 5 and 13 are also increased stepwise to the maximum opening areas shown in FIG. 1C.

The rate of the increase in opening area of the main aperture 5 or auxiliary aperture 13 may be arbitrarily selected as needs demand by suitably selecting the configurations of the main openings 3 and 4 and the guide slots 9 and 10.

Next referring to FIG. 2, the construction and mode of operation of the step-motor 6 will be described. The step-motor 6 comprises a rotor 14 made of a permanent magnet and two stators 15 and 16 with center-tapped coils 17 and 18 wound thereon and with their poles equiangularly spaced around the rotor 14. The center taps are connected to the positive terminal of a power supply 21 while the ends of the coils 17 and 18 are connected through switches 19 and 20, respectively, to the negative terminal of the power supply 21.

Figure 2A:
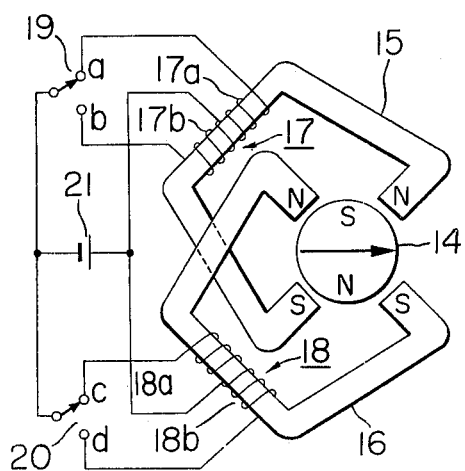
FIGS. 2A and 2B are schematic views used for the explanation of the construction and mode of operation of a step-motor used in the present invention.

To rotate the rotor 14, the switches 19 and 20 are switched to change the polarities of the poles of the stators 15 and 16. That is, when the switches 19 and 20 are closing the contacts a and c, respectively, as shown in FIG. 2A, the coil sections 17a and 18a of the coils 17 and 18 are energized so that the stators 15 and 16 are magnetized with the polarities shown in FIG. 2A. As a result, the rotor 14 remains in the position indicated by the arrow in FIG. 2A where the equilibrium is set among the magnetic forces interacting between the rotor 14 and the stators 15 and 16.

Figure 2B:
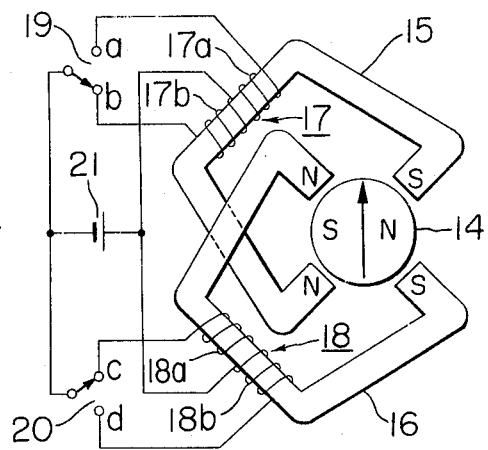
Figure 5:
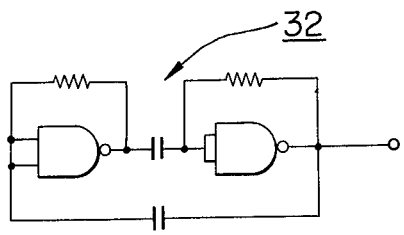
FIG. 5 is a diagram of a conventional type clock pulse generator used in this invention.

When the switch 19 is switched to close the contact b as shown in FIG. 2B, the coil sections 17b and 18a are energized so that the direction of magnetization of the stator 15 is reversed while the direction of magnetization of the stator 16 remains unchanged as shown in FIG. 2B. As a result, the rotor 14 rotates through 90° in the counterclockwise direction to the position shown in FIG. 2B where the new magnetic equilibrium is set. In like manner, whenever the switch 19 or 20 or both are switched, the rotor 14 makes one step rotation through 90°. The sequence of energization of the coil sections 17a, 17b, 18a and 18b for rotating the step-motor 6 step by step is shown in FIG. 3A. In practice, instead of the switches 19 and 20, a pulse control circuit or electronic switching circuit is used in order to selectively energize the coil sections 17a through 18b so that the pulse-shaped signals are applied to them as shown in FIG. 3B where H denotes a high level; that is, the coil section energized and L, a low level; that is, the coil section de-energized.

Next referring to FIG. 4, the motor control circuit 22 will be described which energizes the coil sections 17a–18b in the sequence described above. The motor control circuit 22 comprises two EXCLUSIVE OR gates 23 and 24, two D flip-flops 25 and 26, and four buffer transistors 27, 28, 29 and 30. The clock pulses are impressed to an input terminal CP while the reset pulse is applied to a reset terminal R in order to reset the circuit 22, thereby returning the step-motor 6 to its initial position every time after the exposure operation is accomplished.

Figure 6A:
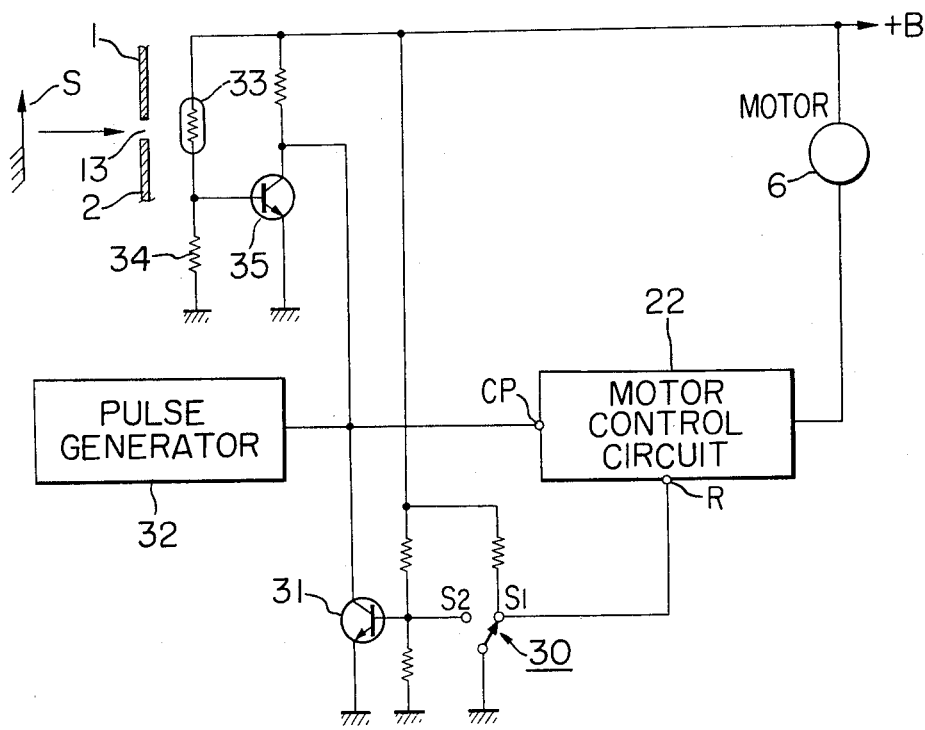
FIG. 6A is a diagram of an electronic control circuit including the motor control circuit shown in FIG. 4 of the first embodiment.

Next referring to FIG. 6, the electronic control circuit including the motor control circuit 22 of the first embodiment will be described. When the shutter button (not shown) is not depressed, a switch 30 is closing the contact $S_1$ as shown in FIG. 6A so that the reset signal or L-level signal is kept impressed to the reset terminal R of the motor control circuit 22. When the shutter button is depressed, the switch 30 is switched to close the contact $S_2$ so that H-level signal is impressed to the reset terminal R to set the motor control circuit 22 ready for operation. Concurrently, a transistor 31 is turned off because its base is grounded so that the clock pulse from a pulse generator 32 (See FIG. 5) are transmitted and applied to the input terminal CP of the motor control circuit 22. As a result the step-motor 6 makes one step rotation in the manner described above, causing the shutter blades 1 and 2 to shift to define the first main aperture as shown in FIG. 6C.

Figure 6B:
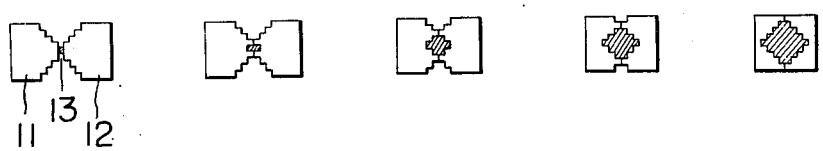
FIG. 6B is a view used for the explanation of the opening area of an auxiliary aperture of the first embodiment.

The light from a subject S passes through the auxiliary aperture 13 defined by the overlapped auxiliary openings 11 and 12 of the shutter blades, and is intercepted by a photosensitive transducer such as a photocell 33. When the brightness or luminance of the subject S is low, the resistance across the photocell 33 remains high so that the voltage across an output resistor 34 is lower than a threshold voltage of a transistor 35. As a result, the transistor 35 remains turned off. Therefore, the transmission of another clock pulse from the pulse generator 32 to the motor control circuit 22 is still permitted so that the step-motor 6 makes the second step rotation, causing the shutter blades 1 and 2 to define the second main aperture as shown in FIG. 6C. In like manner, the third, fourth and fifth main apertures are defined as shown in FIG. 6C while the opening area of the auxiliary aperture 13 is increased in proportion to the opening area of the main aperture as shown in FIG. 6B. Therefore, the quantity of light intercepted by the photocell 33 is increased so that the voltage across the resistor 34 finally reaches the threshold voltage $g$ (See FIG. 7) at a certain step. As a result, the transistor 35 becomes conductive so that the transmission of the clock pulse from the pulse generator 32 to the motor control circuit 22 is interrupted. Consequently, the stepwise rotation of the step-motor 6 is interrupted so that the main aperture 5 is set to the relatively large opening area $h$ (See FIG. 7) in response to the relatively low brightness of the subject S.

On the other hand, when the brightness of the subject is relatively high, the voltage across the resistor 34 rises above the threshold voltage $g$ to the level $i$ within a relatively short time so that the transmission of clock pulses is interrupted sooner. Therefore, for instance, only one clock pulse $e$ is applied to the motor control circuit 22 as shown in FIG. 7 so that the main aperture 5 is set to the relatively small opening area $j$.

After the main aperture is set to the optimum aperture or f/number depending upon the brightness of a subject, the switch 30 is switched to close the contact $S_1$ again so that the motor control circuit 22 is reset and consequently the shutter blades 1 and 2 are immediately returned to their initial position under the force of the return spring 36 (See FIG. 1).

So far the step-motor 6 has been described as rotating step by step through 90°, but it will be understood that the angle of one step rotation of the step-motor 6 may be arbitrarily selected between 1° and 90° as needs demand. In general, the smaller the angle of rotation, the lower the rate of the increase in opening area of the main aperture can be made with the result of the aperture or f/number setting with a higher degree of accuracy.

So far the main aperture has been merely described as being set to the optimum aperture or f/number depending upon the brightness or luminance of the subject measured through the auxiliary aperture 13 which has been also merely described as being increased stepwise with the increase of the opening area of the main aperture. However, in practice, there must be established one-to-one correspondence between the opening area of f/number defined by the main aperture and the luminance of the subject. Therefore, the method for establishing this one-to-one correspondence will be described. According to the first embodiment of the present invention, the sides of the auxiliary openings 11 and 12 of the shutter blades are stepped as shown in FIG. 6B. Therefore, in response to the first step rotation of the step-motor 6, the auxiliary aperture 13 is opened as shown at FIRST STEP in FIG. 6B while the main aperture 5 is opened to stop down the camera lens to $f/16$ as shown in FIG. 6C. Then, whether or not the main aperture 5 is further opened to the next $f$/number of $f/8$ is dependent upon the brightness or luminance of the subject. In the instant embodiment, the opening area of the auxiliary aperture 13 in the first step is so selected that when the luminance is higher than $7.68 \times 10^3$ cd/m$^2$, the output voltage from the photocell 33; that is, the voltage across the output resistor 34 rises above the threshold voltage $g$ of the transistor 35. As a result, the clock pulse transmission is interrupted in the manner described above so that the main aperture will not be opened to the next $f$/number or $f/8$. On the other hand, when the brightness or luminance is lower than $7.68 \times 10^3$ cd/m$^2$, the voltage across the resistor 34 is lower than the threshold voltage $g$ so that the clock pulse is transmitted to the motor control circuit 22. Therefore, the main aperture is opened to $f/8$ in response to the second step-by-step rotation of the step-motor 6. In the second step, the auxiliary aperture 13 is opened as shown at SECOND STEP in FIG. 6B, and the opening area is so selected that when the brightness or luminance is higher than $1.92 \times 10^3$ cd/m$^2$, the main aperture is not permitted to open to the next $f$/number or $f/4$. On the other hand, when the brightness or luminance is less than $1.92 \times 10^3$ cd/m$^2$, the main aperture is opened further to $f/4$ in the manner described above. In like manner, the opening areas of the auxiliary aperture may be determined in the third, fourth and fifth steps.

Alternatively, the one-to-one correspondence may be established by suitably selecting the gamma value of the photosensitive transducer used or suitably changing the value of the resistor 34 in response to the opening area of the main aperture.

Figure 8:
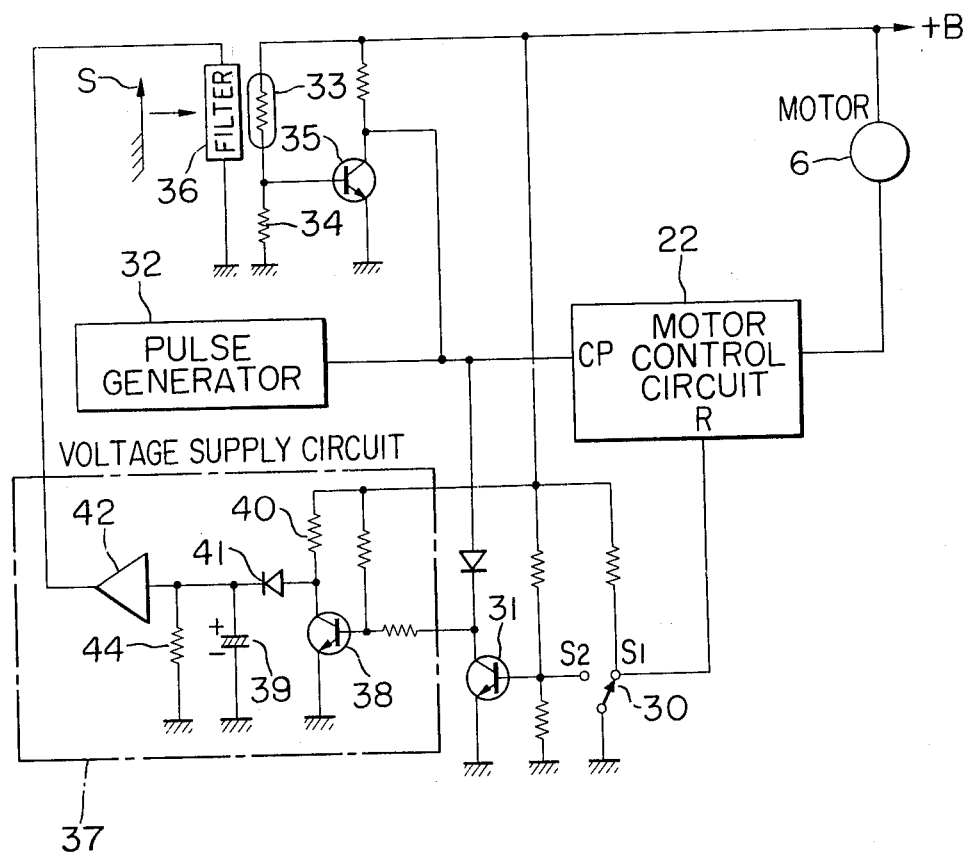
FIG. 8 is a diagram of an electronic control circuit of a second embodiment of the present invention.
Figure 9:
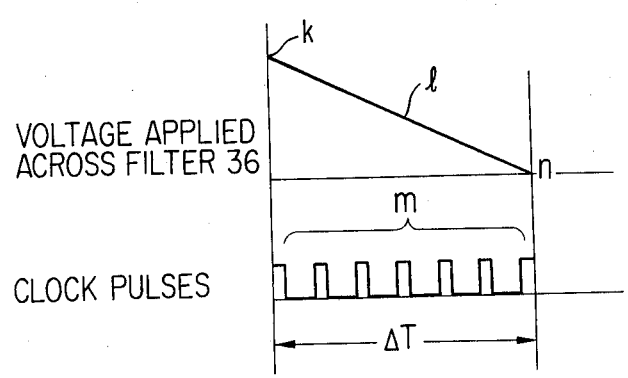
FIG. 9 is a view used for the explanation thereof.

Second Embodiment, FIGS. 8 and 9

In the first embodiment, the quantity of light intercepted by the photocell 33 is controlled by the auxiliary aperture 13 whose opening area is varied, but in the second embodiment, the light is controlled electrically as will be described in detail hereinafter by an electro-optical filter such as liquid crystal 36 placed in front of the photocell 33. The filter 36 is connected to a voltage supply circuit 37 so that the voltage applied across the filter 36 may be controlled in response to the opening area of the main aperture.

When the transistor 31 is turned on, a transistor 38 is turned off so that the current from the power supply $+B$ flows through a resistor 40 and a diode 41 to charge a capacitor 39 with the polarities shown. The relatively high voltage $k$ (See Fig. 9) is therefore impressed across the filter 36 as the voltage across the capacitor 39 is amplified by an amplifier 42. Therefore, the light transmission capability of the filter 36 is very low so that the light reception by the photocell 33 is almost completely blocked. However, when the switch 30 is switched to close the contact $S_2$ in the manner described above, the transistor 31 is turned off so that the transistor 38 conducts and consequently the capacitor 39 is disconnected from the power supply $+B$. As a result, the capacitor 39 is discharged gradually through a resistor 44 so that the voltage applied from the amplifier 42 is gradually decreased as indicated by the discharge characteristic $l$ in FIG. 9. As a result, the light transmission capability of the filter 36 is gradually increased so that the quantity of light intercepted by the photocell 33 is also increased.

In the instant embodiment, it is assumed that in response to 7 clock pulses (See FIG. 9), the main aperture is step-by-step opened from the closed state (See FIG. 1B) to the wide opened position (See FIG. 1C) during $\Delta T$. The values of the capacitor 39 and the resistor 44 are so selected that during this time interval $\Delta T$ the voltage across the capacitor 39 drops linearly from the high level $k$ to the low level $n$ as shown in FIG. 9.

When the brightness or luminance of a subject is relatively low, the opening area of the main aperture is increased stepwise as the shutter button is depressed in a manner substantially similar to that of the first embodiment while the light transmission capability of the filter 36 is gradually increased as the voltage across the filter 36 is gradually decreased in the manner described above. As a result, the resistance of the photocell 33 is gradually decreased. When the voltage across the resistor 34 finally rises to the threshold voltage of the transistor 35, the latter conducts, whereby the step-by-step rotation of the step-motor 6 is interrupted and consequently the main aperture is opened to a relatively large opening area.

On the other hand, when the brightness or luminance of a subject is relatively low, the voltage across the resistor 34 rises beyond the threshold value within a short time so that the main aperture is stopped to a relatively small opening area in a manner substantially similar to that of the first embodiment.

In summary, the voltage applied across the electro-optical filter 36 is gradually decreased from a predetermined high level to a predetermined low level during a predetermined time required for the main aperture to be wide opened so that the quantity of light intercepted through the filter 36 by the photocell 33 may be suitably controlled. Therefore, the second embodiment has a distinct advantage over the first embodiment in that the auxiliary openings may be eliminated and consequently the construction may be much simplified. A further advantage is that the range of the luminance of a subject to be detected and measured will not change when once so established. Therefore, the cumbersome problem of determining the opening area of the auxiliary aperture in each step for measuring the desired range of luminance intensity may be avoided.

Figure 10:
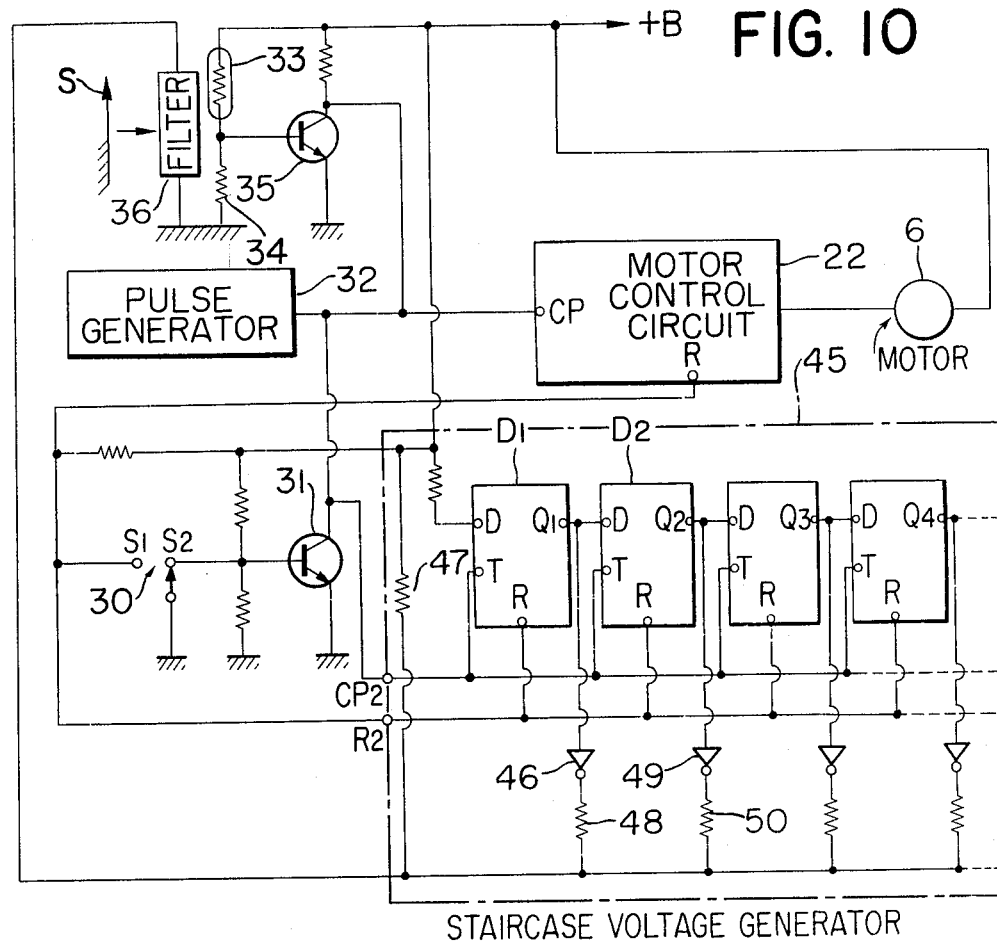
FIG. 10 is a diagram of a modification of the electronic control circuit shown in FIG. 8
Figure 11:
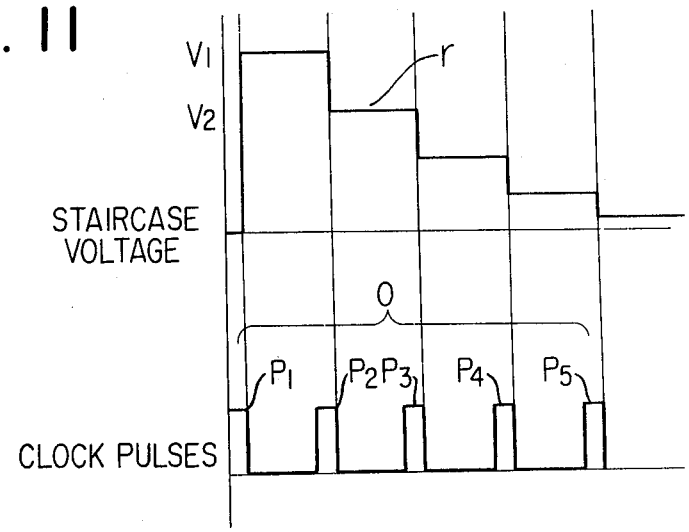
FIG. 11 is a view used for the explanation thereof.

Modification of Second Embodiment, FIGS. 10 and 11

The modification of the second embodiment shown in FIG. 10 is different from the second embodiment in that the decreasing staircase voltage is applied across the filter 36 as shown at $r$ in FIG. 11. That is, the voltage across the filter 36 is digitally changed in response to the digital change in the opening area of the main aperture. Therefore, the filter 36 is connected to a staircase voltage generator 45 consisting of D flip-flops $D_1$–$D_n$. Simultaneously when the first clock pulse $P_1$ (See FIG. 11) is applied from the pulse generator 32 to the motor control circuit 22, this clock pulse is also impressed to an input terminal $CP_2$ of the circuit 45. Therefore, in response to the first pulse $P_1$, the output at the terminal $Q_1$ of the first D flip-flop $D_1$ rises to a high level, and is inverted by a first inverter 46 into a low level signal. As a result, the voltage whose magnitude $V_1$ (See FIG. 11) is determined by resistors 47 and 48 of the resistor network is applied across the filter 36. Then, the light transmission capability of the filter 36 is set in response to the voltage $V_1$ thereacross. When the brightness or luminance of a subject is relatively low, the main aperture is further opened in the same manner with that described above so that the second clock pulse $P_2$ is impressed to the input terminal $CP_2$. Then, the output at the terminal $Q_2$ of the second flip-flop $D_2$ rises to the high level, and this high-level output is inverted to the low-level signal by a second inverter 49. As a result, the resistor 48 and a resistor 50 are connected in parallel, and the voltage whose magnitude is determined by the parallel-connected resistors 47, 48 and 50 in the resistor network is applied across the filter 36. That is, as shown in FIG. 11, the voltage drops stepwise to $V_2$. In like manner, the staircase voltage is applied across the filter 36 depending upon the brightness or luminance of a subject. Thus, there may be established one-to-one correspondence between the aperture or f/number and the brightness or luminance of a subject.

As the electrooptical filter 36, a liquid crystal plate in nematic state may be used which changes its transmissibility in response to the voltage applied thereacross. Alternatively, a Kerr cell may be used which also changes its transmissibility in response to the voltage applied thereacross.

Further, the filter can be selected from the group consisting of mixtures in which when subjected to electric field, spherical, cotten-shaped or rod-shaped substances floating in a medium are changed in orientation, whereby the light transmissibility of the mixture changes.

Still further, the element can be selected from the group consisting of substances of the type in which when subjected to the electric field the orientation of crystal atoms and/or molecules changes.

As descroded above, according to the second embodiment and its modification of the present invention, instead of the auxiliary aperture as light control means of the first embodiment, the electro-optical filter is used in order to control the light incident upon the photocell so that the following advantages over the first embodiment may be obtained:

(a) the design of the aperture setting blades is very simple;

(b) the position of the photocell may be arbitrarily selected so that the design of the aperture setting device may be much simplified; and (c) the error in measurement by the photocell due to the change of the acceptance angle may be completely avoided because, opposed to the auxiliary aperture whose opening area changes, the acceptance angle remains unchanged.

As described hereinbefore, according to the present invention, the optimum aperture or f/number may be almost instantaneously set by the shutter blades which are driven by the step-motor in response to the number of clock or driving pulses number of which is dependent upon the brightness or luminance of a subject. In general, the conventional step-motors have a speed of 1,000 to 10,000 pps (pulse per second). Therefore, when the shutter is so designed that the main aperture reaches the maximum opening in five steps; that is, in response to five pulses, the time required for the shutter for defining the maximum aperture is of the order of 5/1,000 to 5/10,000 seconds. Thus, within a very short time, the desired aperture of f/number may be set.

The mechanical strength of the step-motor including its bearings is far stronger than that of the servomotor and galvanometer used in the conventional shutter, and is capable of withstanding far greater mechanical shock.

What is claimed is:

1. An aperture setting device comprising (a) an aperture setting mechanism including
 (i) a plurality of aperture setting blades defining a variable main aperture in an optical path between a subject and a photosensitive recording medium;
 (ii) a photosensitive transducer, an auxiliary radiation control apparatus located in an optical path between said subject and said transducer and controlled together with said shutter blades to control the amount of light incident on said transducer from said subject, said auxiliary radiation control apparatus comprising
  (A) an electro-optic light transmission control means for altering its light transmission characteristics in response to a voltage applied thereacross, and
  (B) a voltage generating means electrically connected to said electro-optic light transmission means for providing a gradually increasing voltage across said electro-optic light transmission control means in response to said shutter release signal and for a time period sufficient to completely open said main aperture,
 (iii) a reversible step-motor drivingly coupled to said aperture setting blades for driving them step by step;
(b) a step-motor control circuit means for controlling each step-by-step rotation of said step-motor in response to a corresponding received pulse signal;
(c) a clock pulse generator;
(d) a first control circuit responsive to a shutter release signal for permitting pulses from said clock pulse generator to rotate said step motor through said step motor control circuit; and
(e) a second control circuit connected to said photosensitive transducer and cooperating with said auxiliary control apparatus for setting a discrete threshold level of light from the subject for each opening step of said shutter blades and for interrupting the transmission of the pulses from said pulse generator to said motor control circuit in response to a light level from said subject that exceeds any of said discrete threshold levels.

2. An aperture setting device as recited in claim 1, wherein said electrooptic element comprises a liquid crystal in nematic state.

3. Apparatus as recited in claim 1, wherein said electrooptic means comprises a suspension of electrophoretic particles having an orientation that varies in response to a changing electric field to thereby alter the light transmissibility of the suspension.

4. An apparatus as recited in claim 1, wherein said electrooptic means comprises a substance of the type that changes the orientation of its crystal atoms and/or molecules in response to variations in a surrounding electric field, thereby varying the transmissibility of light through the substance.

5. An aperture setting device as recited in claim 1, wherein said voltage generating means comprises a time constant circuit comprising a resistor, and a capacitor in parallel with said resistor, whereby the output voltage from said capacitor decreases linearly from a high level to a low level during said main aperture opening interval.

6. An aperture setting device as recited in claim 5, wherein said voltage generating means further comprises a further resistor, and a diode connected in series to said resistor, a power supply connected to said series circuit of said second resistor and said diode, said first control circuit further comprising means for permitting said capacitor to be charged through said diode in response to the absence of a shutter release signal, and for stopping the charging of said capacitor in response to the presence of a shutter release signal, and a resistor connected in parallel with said capacitor for discharging said capacitor after said capacitor has been charged through said diode.

7. An aperture setting device as recited in claim 1, wherein said voltage generating means comprises a counter circuit for sequentially generating a voltage that decreases in steps in response to the shutter release signal from a high level at the beginning of said shutter opening process to a lowest level when said main aperture is wide open.

8. An aperture setting device as recited in claim 7, wherein said counter circuit comprises
   (a) a shift register operable in response to pulses from said pulse generator, and
   (b) a voltage divider resistor network connected to said shift register and being sequentially selected by said shift register and connected in parallel to each other thereby, whereby the voltage from said power supply is divided by said resistor network and applied to said electrooptic element.

9. An aperture setting device as recited in claim 7, further comprising switching means connected to said motor control circuit and said counter for deactivating said motor control circuit and said counter in response to the absence of a shutter release signal, and for activating both said motor control circuit and said counter-type voltage generating means in response to the presence of said shutter release signal.

10. An aperture setting device comprising
   (a) an aperture setting mechanism including
      (i) a plurality of aperture setting blades adapted to define an opening-area-variable main aperture in the optical path from a subject to a photosensitive recording medium,
      (ii) incident light control means adapted to control the quantity of the light from the subject to be intercepted by a photosensitive transducer in proportion to the opening area of said main aperture, said means comprising
         (A) an electrooptical light transmission control element adapted to change its light transmissibility in response to the voltage applied thereacross, and
         (B) a voltage generating means electrically connected to said element and adapted to change linearly or stepwise the voltage applied across said element from a predetermined high level to a predetermined low level during the time interval when said main aperture is opened from its closed state to the wide opened state, said voltage generating means including a time constant circuit comprising
            a resistor, and
            a capacitor,
         whereby the output voltage from said voltage generator may be decreased linearly from said high level to said low level during said predetermined time interval, and
      (iii) a reversible step-motor drivingly coupled to said aperture setting blades for driving them step by step;
   (b) a step-motor control circuit adapted to control the step-by-step rotations of said step-motor in response to the pulse or pulses received;
   (c) a pulse generator adapted to generate the pulse signals to be applied to said motor control circuit;
   (d) a first control circuit operatively coupled to shutter release means in such a way when said shutter release means is actuated, said first control circuit may permit the transmission of the pulse signals from said pulse generator to said motor control circuit; and (e) a second control circuit including said photosensitive transducer and adapted to interrupt the transmission of the pulse signal from said pulse generator to said motor control circuit when the output from said photosensitive transducer exceeds a predetermined level,
   whereby the main aperture may be set to the optimum opening depending upon the luminance of the subject.

11. An aperture setting device as set forth in claim 10 wherein
   said voltage generating means further includes a series circuit consisting of a resistor and a diode and connected to a power supply, said capacitor in said voltage generating means being charged through said series circuit when said first control circuit is conducted; and
   a discharge resistor through which said capacitor is discharged when said first control circuit is switched into the cut in state.

12. An aperture setting device comprising
   (a) an aperture setting mechanism including
      (i) a plurality of aperture setting blades adapted to define an opening-area-variable main aperture in the optical path from a subject to a photosensitive recording medium,
      (ii) incident light control means adapted to control the quantity of the light from the subject to be intercepted by a photosensitive transducer in proportion to the opening area of said main aperture, said means comprising
         (A) an electrooptical light transmission control element adapted to change its light transmissibility in response to the voltage applied thereacross, and
         (B) a voltage generating means electrically connected to said element and adapted to change linearly or stepwise the voltage applied across said element from a predetermined high level to a predetermined low level during the time interval when said main aperture is opened from its closed state to the wide opened state, and
      (iii) a reversible step-motor drivingly coupled to said aperture setting blades for driving them step by step;
   (b) a step-motor control circuit adapted to control the step-by-step rotations of said step-motor in response to the pulse or pulses received;
   (c) a pulse generator adapted to generate the pulse signals to be applied to said motor control circuit;
   (d) a first control circuit operatively coupled to shutter release means in such a way when said shutter release means is actuated, said first control circuit may permit the transmission of the pulse signals from said pulse generator to said motor control circuit; and (e) a second control circuit including said photosensitive transducer and adapted to interrupt the transmission of the pulse signal from said pulse generator to said motor control circuit when the output from said photosensitive transducer exceeds a predetermined level, said second control circuit comprising (A) said photosensitive transducer so positioned as to intercept the light passing through said light transmission control element, and (B) an output resistor electrically connected to said photosensitive transducer, and (C) a switching circuit electrically connected to said output resistor in such a way that when the voltage across said output resistor exceeds a predetermined level, said switching circuit switches from one state to another, whereby the transmission of the pulse from said pulse generator to said motor control circuit may be interrupted.

13. An aperture setting device comprising
(a) an aperture setting mechanism including
 (i) a plurality of aperture setting blades adapted to define an opening-area-variable main aperture in the optical path from a subject to a photosensitive recording medium,
 (ii) incident light control means adapted to control the quantity of the light from the subject to be intercepted by a photosensitive transducer in proportion to the opening area of said main aperture, said means comprising
  (A) an electrooptical light transmission control element adapted to change its light transmissibility in response to the voltage applied thereacross, and
  (B) a voltage generating means electrically connected to said element and adapted to change linearly or stepwise the voltage applied across said element from a predetermined high level to a predetermined low level during the time interval when said main aperture is opened from its closed state to the wide opened state, said voltage generating means comprising, a counter circuit adapted to generate the voltage which sequentially drops stepwise in response to the opening area or said main aperture from the highest level when said main aperture is closed to the lowest level when said main aperture is wide opened, and
 (iii) a reversible step-motor drivingly coupled to said aperture setting blades for driving them step by step;

(b) a step-motor control circuit adapted to control the step-by-step rotations of said step-motor in response to the pulse or pulses received;

(c) a pulse generator adapted to generate the pulse signals to be applied to said motor control circuit;

(d) a first control circuit operatively coupled to shutter release means in such a way when said shutter release means is actuated, said first control circuit may permit the transmission of the pulse signals from said pulse generator to said motor control circuit; and (e) a second control circuit including said photosensitive transducer and adapted to interrupt the transmission of the pulse signal from said pulse generator to said motor control circuit when the output from said photosensitive transducer exceeds a predetermined level.

14. An aperture setting device as set forth in claim 13 wherein said counter circuit comprises
 (a) a shift register with a suitable number of bits and adapted to be operated in response to the pulses from said pulse generator, and
 (b) a voltage divider consisting of a resistor network arrayed in such a way that in response to the output from said shift register, the resistors in said resistor network are sequentially selected and connected in parallel each other, whereby the voltage from said power supply may be divided by said parallel-connected resistors and applied to said element.

15. An aperture setting device as set forth in claim 13 further including
 switching means operatively coupled to said shutter release means in such a way that when said shutter release means is not actuated, said switching means switches said motor control circuit and said counter type voltage generating means in the desired set state, but when said shutter release means is actuated, said switching means releases said motor control circuit and said counter-type voltage generating means from said set state.

* * * * *

UNITED STATES PATENT OFFICE
CERTIFICATE OF CORRECTION

Patent No. 4,079,390  Dated March 14, 1978

Inventor(s) Hiroshi Iwata, et al

It is certified that error appears in the above-identified patent and that said Letters Patent are hereby corrected as shown below:

Column 2, line 21: After "7B" insert --are--.

line 38: "setting" should be --settings--.

Column 7, line 32: "descrobed" should be --described--.

Column 12, line 31: "registor" should be --register--.

Signed and Sealed this

Seventeenth Day of October 1978

[SEAL]

Attest:

RUTH C. MASON  
Attesting Officer

DONALD W. BANNER  
Commissioner of Patents and Trademarks